(12) United States Patent
Rauser

(10) Patent No.: US 12,313,291 B2
(45) Date of Patent: May 27, 2025

(54) SUPPLY CIRCUIT FOR A HEAT TRANSFER MEDIUM FOR A CONSUMER, INDUSTRIAL INSTALLATION AND METHOD FOR OPERATING SAME

(71) Applicant: EISENMANN GMBH, Böblingen (DE)

(72) Inventor: Wolfgang Rauser, Ebhausen (DE)

(73) Assignee: EISENMANN GMBH, Böblingen (DE)

( * ) Notice: Subject to any disclaimer, the term of this patent is extended or adjusted under 35 U.S.C. 154(b) by 512 days.

(21) Appl. No.: 17/633,364

(22) PCT Filed: Aug. 3, 2020

(86) PCT No.: PCT/EP2020/071814
§ 371 (c)(1),
(2) Date: Aug. 5, 2022

(87) PCT Pub. No.: WO2021/023714
PCT Pub. Date: Feb. 11, 2021

(65) Prior Publication Data
US 2022/0412581 A1    Dec. 29, 2022

(30) Foreign Application Priority Data

Aug. 8, 2019    (DE) ...................... 10 2019 121 412.2

(51) Int. Cl.
*F24F 5/00* (2006.01)
*F24F 11/84* (2018.01)
(Continued)

(52) U.S. Cl.
CPC ............ *F24F 5/0046* (2013.01); *F24F 11/84* (2018.01); *F24F 2005/0053* (2013.01); *F24F 2140/12* (2018.01); *F24F 2140/20* (2018.01)

(58) Field of Classification Search
CPC ............ F28D 20/0052; F28D 20/0034; F28D 2020/0069; F28D 2020/006; F24D 2200/11; Y02B 10/40
See application file for complete search history.

(56) References Cited

U.S. PATENT DOCUMENTS 2,167,878 A * 8/1939 Crawford ................ F24F 3/153
165/104.31
2,793,004 A    5/1957 Schumann
(Continued)

FOREIGN PATENT DOCUMENTS

CN    104 515 220    4/2015
CN    106 642 460    5/2017
(Continued)

*Primary Examiner* — Nelson J Nieves
*Assistant Examiner* — Meraj A Shaikh
(74) *Attorney, Agent, or Firm* — SCHROEDER INTELLECTUAL PROPERTY LAW GROUP, LLC

(57) ABSTRACT

An industrial installation having a primary supply circuit in which cooling water is conveyed and a consumer to which cooling water from the primary supply circuit is provided and which is connected to the primary supply circuit via a secondary supply circuit. An outward flow line of the secondary supply circuit is connected to an outward flow line of the primary supply circuit, and a return flow line of the secondary supply circuit is connected to a return flow line of the primary supply circuit. The outward flow line of the primary supply circuit is connected to a groundwater delivery line of a spring installation which has a groundwater delivery line through which groundwater can be conveyed from an aquifer and can be fed as cooling water into the outward flow line of the primary supply circuit. Also provided is a method for operating an industrial installation wherein the cooling water that is used is naturally occurring groundwater which is obtained from an aquifer with the aid of a spring installation.

15 Claims, 3 Drawing Sheets

(51) Int. Cl.
  *F24F 140/12* (2018.01)
  *F24F 140/20* (2018.01)

(56) References Cited

U.S. PATENT DOCUMENTS

2011/0146317 A1* 6/2011 Cline ................... F25B 7/00
  62/238.7
2015/0211528 A1* 7/2015 Byskov Skafsgaard ...................
  F24D 19/1024
  417/26
2019/0024995 A1* 1/2019 Rauser ................... F28F 27/02

FOREIGN PATENT DOCUMENTS

| DE | 26 13 203 | 10/1977 | |
|----|-----------|---------|---|
| EP | 2 913 614 | 9/2015 | |
| EP | 2913614 B1 * | 1/2018 | ......... F28D 20/0052 |
| EP | 3 431 889 | 1/2019 | |
| JP | 2007-132582 | 5/2007 | |

* cited by examiner

SUPPLY CIRCUIT FOR A HEAT TRANSFER MEDIUM FOR A CONSUMER, INDUSTRIAL INSTALLATION AND METHOD FOR OPERATING SAME

RELATED APPLICATIONS

This application is a § 371 national phase of International Patent Application No. PCT/EP2020/071814 filed Aug. 3, 2020, which claims the filing benefit of German Patent Application No. 10 2019 121 412.2 filed Aug. 8, 2019, the contents of both of which are incorporated herein by reference.

FIELD OF THE INVENTION

The invention relates to an industrial installation with
a) a primary supply circuit, in which cooling water is conducted;
b) a consumer, to which cooling water from the primary supply circuit is made available, and which is connected via a secondary supply circuit to the primary supply circuit for this purpose;
c) an inflow line of the secondary supply circuit being connected to an inflow line of the primary supply circuit, and a return line of the secondary supply circuit being connected to a return line of the primary supply circuit.

Moreover, the invention relates to a method for operating a supply circuit or an industrial installation.

BACKGROUND OF THE INVENTION

In industrial installations, there are distributing sections for cooling water in a known way, which distributing sections form a primary supply circuit for the cooling water, by means of which primary supply circuit thermal energy can be absorbed from or dissipated to consumers with the aid of consumer heat exchangers there, as a result of which a cooling capacity can be achieved at the consumers.

For example, cooling water is used in treatment plants for treating objects, in particular vehicle bodies, that is to say bodies of passenger cars and trucks, and/or of parts or attachment parts of vehicle bodies. Treatment plants of this type include, above all, paint shops, in which the objects are coated with paint. In paint shops of this type, the paints or treatment liquids, for example, can be cooled by way of the cooling water. A comparatively great effort is made for cooling, above all, for treatment liquids which are used in conjunction with a dipping treatment of the objects.

Cooling water is used not only in paint shops, but rather in the case of many other industrial installations, for example, in order to cool air in conjunction with air conditioning, which air can then be fed as cooling air to working processes. For example, cooled air can be conducted into cooling zones of drying installations. Here, paint shops are again, in particular, of interest, which paint shops comprise drying installations, in which the painted objects are dried. Air conditioning frequently comprises dehumidification of the air, to which end the air to be dehumidified has to be cooled down, in order that the entrained water condenses.

The cooling water has to be at a temperature which ensures a sufficient cooling capacity. Refrigerating machines are as a rule used for this purpose, as are known per se. The energy input can be quite high here.

SUMMARY OF THE INVENTION

It is an object of the invention to provide an industrial installation and a method of the type mentioned at the outset which make it possible for cooling water to be provided and used in a resource-friendly and energy-efficient manner.

This object is achieved in the case of an industrial installation of the type mentioned at the outset by virtue of the fact that
d) the inflow line of the primary supply circuit is connected to a groundwater conveying line of a well system which comprises a groundwater conveying device and by means of which groundwater can be conveyed out of an aquifer and by means of which this groundwater can be fed as cooling water into the inflow line of the primary supply circuit.

It has been recognized according to the invention that naturally occurring groundwater has a great potential for cooling purposes for industrial installations. Depending on the depth, at which the groundwater is situated in the ground, groundwater is at an initial temperature of, for example, from 14° C. to 16° C., which is already a sufficiently low temperature for cooling purposes for many applications. Energy-intensive cooling of the cooling water per se can possibly be dispensed with completely.

It is favorable if the return line of the primary supply circuit is connected to an outflow line which outputs cooling water as return water to a discharge well of the well system or outputs it to the environment in another way. By way of a discharge well, the cooling water is fed to the groundwater again, for which reason the system is particularly sustainable. Since a closed circuit is possible, there is also no risk of contamination of the cooling water with contaminants, which contamination would prohibit a return of the cooling water into the natural cycle. As an alternative to a discharge well, the return water can be utilized, for example, agriculturally and can be used, for example, as irrigation water on fields, other cultivated areas or else in greenhouses.

It can be advantageous if the primary supply circuit is connected to an aftercooling system, by means of which cooling water can be cooled in the inflow line of the primary supply circuit. By way of an aftercooling system of this type, the groundwater can be cooled to a temperature if the initial temperature of the groundwater is not sufficient for the required cooling capacity at the consumer or consumers. Since, however, the groundwater already has a comparatively low initial temperature, the energy input for this purpose is even lower than for cooling water which is initially at room temperature.

It is favorable if the aftercooling system comprises an aftercooling heat exchanger, through which an inflow bypass line of the inflow line of the primary supply circuit leads and to which a separate cooling medium, in particular water, glycol or a mixture of water and glycol, can be fed, it being possible for the inflow bypass line to be opened and closed by means of an inflow bypass valve. The aftercooling system can be activated or deactivated as required.

The aftercooling system operates effectively if it comprises one or more refrigerating machines, by means of which the separate cooling medium is cooled.

It is particularly efficient if a return bypass line of the primary supply circuit leads from its return line to the refrigerating machine and back again to the return line, the heat output side of the refrigerating machine being connected via a heat exchanger loop to the return bypass line. In this way, the cooling water which has already been used to cool the consumers can also be used, moreover, to dissipate the waste heat which arises at or in a respective refrigerating machine.

A frequency-regulated pumping device with a cooling water conveying pump and a frequency converter which is assigned to the cooling water conveying pump is preferably provided for conveying the cooling water through the secondary supply circuit. The use of a frequency-regulated pumping device opens up operating modes, in the case of which the energy requirement for the operation of the supply circuit can be correlated with the energy requirement at the consumer. In particular, the conveying capacity of the conveying pump can be varied, as a result of which the volumetric flow of the cooling water through the consumer heat exchanger can be adapted to the requirement there.

The inflow line and the return line of the secondary supply circuit are preferably connected to one another by way of a circulation line in such a way that cooling water can be conducted out of the return line of the secondary supply circuit in a circulating manner into the inflow line of the secondary supply circuit, the circulation line opening upstream of the cooling water conveying pump into the inflow line of the secondary supply circuit, and/or there being a circulation valve, by means of which the proportion of cooling water which flows through the circulation line into the inflow line of the secondary supply circuit can be set. In this way, the heat exchange medium can be reused without, for example, being returned directly again into the above-addressed primary supply circuit. The circulation line preferably opens upstream of the cooling water conveying pump into the inflow line of the secondary supply circuit. The heat exchange medium which flows out of the circulation line into the inflow line is thus effectively conveyed by the cooling water conveying pump and at the same time ensures satisfactory thorough mixing of the heat exchange medium which is already situated in the inflow line with the heat exchange medium from the circulation line.

The groundwater conveying device and, if present, the frequency-regulated pumping device and/or the circulation valve and/or the inflow bypass valve and/or the refrigerating machine can preferably be actuated by means of a control system.

An effective adaptation of the operating modes of the industrial installation and/or the supply circuits in a manner which is dependent on the requirement at the consumer or consumers can take place, in particular, when the control system is connected to a sensor system, by means of which
  a) the inlet pressure of the groundwater on the inlet side of the groundwater conveying device and/or the outlet pressure of the groundwater on the outlet side of the groundwater conveying device;
  and/or
  b) the inlet pressure of the cooling water on the inlet side of the cooling water conveying pump and/or the outlet pressure of the cooling water on the outlet side of the cooling water conveying pump;
  and/or
  c) the temperature of the cooling water in the inflow line of the secondary supply circuit on the inlet side of the consumer heat exchanger and/or the temperature of the cooling water in the return line of the secondary supply circuit on the outlet side of the consumer heat exchanger;
  and/or
  d) the temperature of the cooling water in the inflow line of the primary supply circuit on the outlet side of the return bypass line;
can be detected, and the associated sensor responses can be transmitted to the control system.

The abovementioned object is achieved in the case of a method of the type mentioned at the outset by virtue of the fact that naturally occurring groundwater is used as cooling water, which groundwater is obtained from an aquifer with the aid of a well system.

The advantages are the same as the advantages which have been described above in conjunction with the industrial installation.

Accordingly, it is favorable if the cooling water is cooled in the inflow line of the primary supply circuit with the aid of an aftercooling system if the temperature of the cooling water exceeds a predefined maximum temperature.

An industrial installation with some or all of the features mentioned above with respect to the industrial installation is preferably operated by way of the method.

BRIEF DESCRIPTION OF DRAWINGS

In the following text, exemplary embodiments of the invention will be described in greater detail on the basis of the drawings, in which.

DETAILED DESCRIPTION OF THE INVENTION

Figure 1:
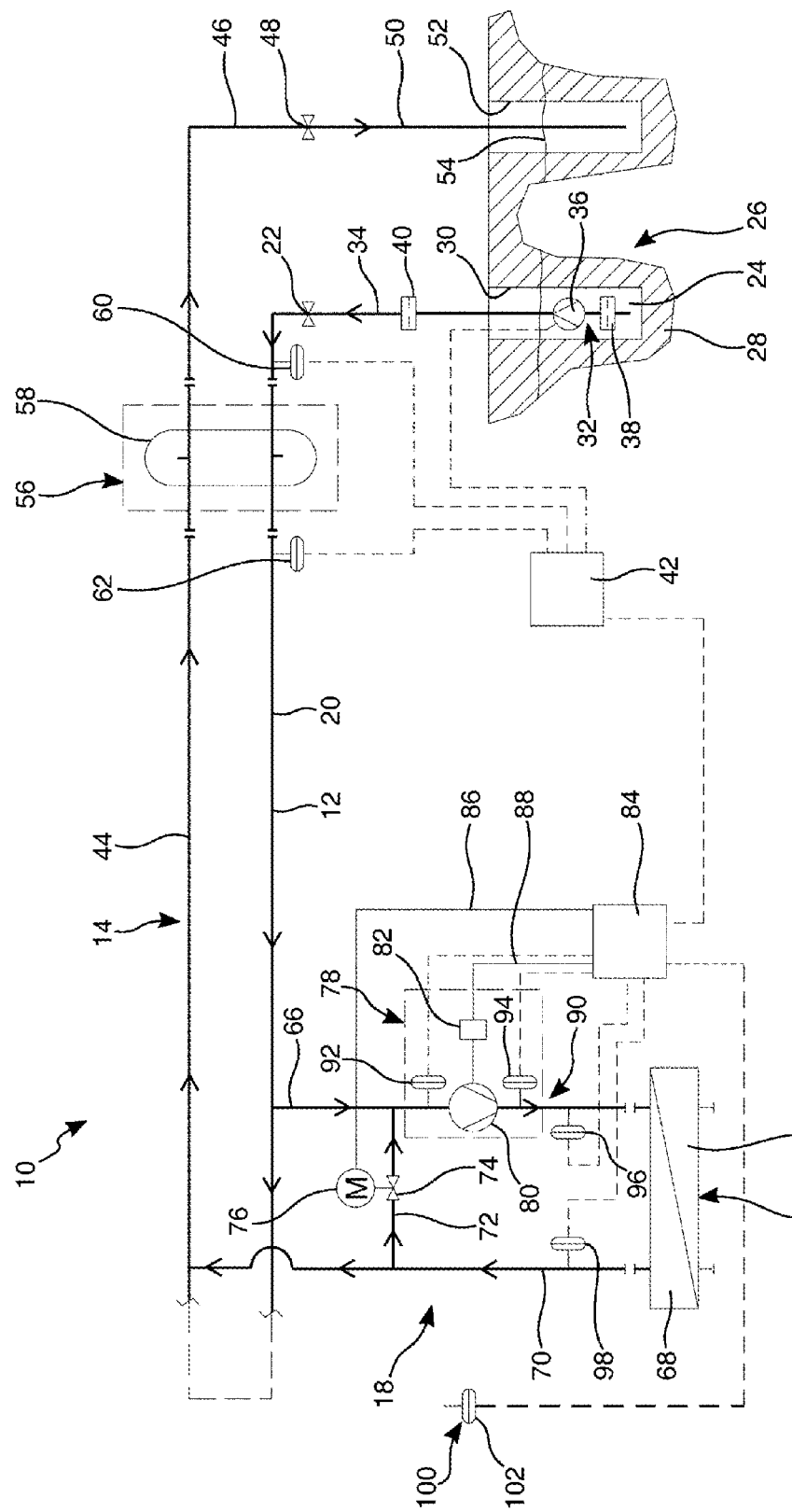
FIG. 1 shows a diagrammatic layout of an industrial installation in accordance with a first exemplary embodiment.

Reference is made first of all to FIG. 1, in which 10 denotes an industrial installation, in the case of which a cooling medium in the form of cooling water 12 is conducted in a primary supply circuit 14. Industrial installations are to be understood to mean, in particular, the above-described industrial installations.

Cooling water 12 is made available from the primary supply circuit to one or more consumers 16 which, for this purpose, are connected via a respective secondary supply circuit 18 to the primary supply circuit 14, only a single consumer 16 being shown in a secondary supply circuit 18 for the sake of clarity. The flow direction of the cooling water 12 in the primary supply circuit 14 and the secondary supply circuit 18 is illustrated by way of respective arrows which are not specifically labeled. A secondary supply circuit 18 of this type generally defines a supply circuit for a consumer 16.

In the following text, the terms "primary supply circuit" and "secondary supply circuit" are shortened to "PC" ("Primary Circuit") and SC ("Secondary Circuit") if they precede the designation of parts and components, in order to clarify their assignment to the primary supply circuit 14 or to the secondary supply circuit 18.

The primary supply circuit 14 comprises a PC inflow line 20, into which cold cooling water 12 is fed at a feed 22. Naturally occurring groundwater 24 is used as cold cooling water 12, which is obtained with the aid of a well system 26 from an aquifer 28, that is to say from groundwater-conducting stone and/or sediment or the like.

To this end, the well system 26 comprises a well shaft 30, in which the groundwater 24 is collected and in which a groundwater conveying device 32 is arranged. The groundwater conveying device 32 comprises a groundwater conveying line 34 which is connected to the feed 22 of the PC inflow line 20 and in which a groundwater conveying pump 36 is arranged.

If a connection between two lines is mentioned here and in the following text, it is also to be understood to mean that two lines which are labeled in accordance with their function merge into one another without a separate component.

Upstream of the groundwater conveying pump 36, an inlet pressure sensor 38 measures the inlet pressure of the groundwater 24 on the inlet side of the groundwater conveying device 32, that is to say of the groundwater conveying pump 36. An outlet pressure sensor 40 measures the outlet pressure of the groundwater 24 on the outlet side of the groundwater conveying device 32, that is to say of the groundwater conveying pump 36. In this way, the possibility for a differential pressure measurement is integrated into the groundwater conveying device 32.

The pressure sensors 38 and 40 transfer their signals to an inflow control device 32 which sets the rotational speed of the groundwater conveying pump 36 and therefore the delivery quantity of groundwater 24.

The groundwater 24 is extracted in a conveying depth of from 4 m to 12 m, particularly in a conveying depth of from 6 m to 10 m or of from 7 m to 9 m. It can apply as a reference variable that groundwater 24 from approximately 9 m to 10 m is at a temperature of from 14° C. to 16° C.

The PC inflow line 20 merges in the flow direction downstream of the consumer or consumers 16 into a PC return line 44, from which cooling water 12 which is warm in comparison with the groundwater exits in the form of return water 46 at an outlet 48. The designations "warm" and "cold" show merely the relative temperatures of the media in comparison; warm cooling water 12 is warmer than cold cooling water 12, that is to say the return water 46 is warmer than groundwater 24 which is conveyed from the well shaft 30. The return water 12 is, for example, at a temperature of between 20° C. and 22° C.

If there is merely a single consumer 16, the secondary supply circuit 18 forms the only connecting line in the flow direction between the PC inflow line 14 and the PC return line 44.

The outlet 48 of the PC return line 44 is connected to an outflow line 50 which outputs the return water 46 to a discharge well 52 which is included in the well system 26. A discharge well 52 of this type is also called a dead well and serves for trickling away of the return water 46, with the result that the latter is fed to the aquifer 28 again.

An irreversible removal of groundwater 24 does not take place as a result of this cycle of the groundwater 24, and the water table which is denoted by 54 remains largely unchanged in conjunction with the industrial installation 10. A change in the composition of the groundwater 24 also does not take place; the groundwater 24 which is conveyed from the well shaft 30 differs from the return water 46 merely in terms of the temperature.

The PC inflow line 20 and the PC return line 44 are decoupled from one another in a manner known per se via an equalizing device 56, in order to equalize circulation flows of different magnitude in the PC inflow line 20 and the PC return line 44. A hydraulic separator 58 is provided for this purpose. A temperature sensor 60 and 62 is provided in each case upstream and downstream of the equalizing device 56 in the flow direction, by way of which temperature sensors 60 and 62 the temperature of the cooling water in the PC inflow line 20 can be detected. The temperature sensors 60 and 62 transmit their signals to the inflow control device 42.

As an example of a consumer 16 in the secondary supply circuit 18, FIG. 1 shows a consumer heat exchanger 64 which can be configured, in particular, as a plate heat exchanger or finned heat exchanger known per se. This consumer heat exchanger 64 for its part can be included, for example, in a circulation air system, in order to control the temperature of air which accrues there and has to be conditioned.

The secondary supply circuit 18 comprises an SC inflow line 66 which leads from the PC inflow line 20 to the consumer heat exchanger 64. There, the secondary inflow line 66 merges into an SC heat exchanger line 68 which leads through the consumer heat exchanger 64 and opens after this into an SC return line 17 which is connected to the PC return line 44.

The SC inflow line 66 and the SC return line 70 are connected to one another by way of an SC circulation line 72 in such a way that cooling water 12 from the SC return line 70 can be conducted in a circulating manner into the SC inflow line 66 again. This return takes place before the cooling water 12 flows back into the PC return line 44. A circulation valve 74 is arranged in the SC circulation line 72, with the result that the proportion of cooling water 12 to be returned, that is to say the proportion of cooling water 12 which flows out of the SC circulation line 72 into the SC inflow line 66, can be set. The circulation valve 74 is operated by means of a valve drive 76.

The secondary supply circuit 18 comprises a frequency-regulated pumping device 78 with a cooling water conveying pump 80 for the cooling water 12, and with an associated frequency converter 82. In the case of the present exemplary embodiment, the cooling water conveying pump 80 is arranged between the SC circulation line 72 and the consumer heat exchanger 64 in the SC inflow line 66. In other words, the SC circulation line 72 opens upstream of the pumping device 78 or the cooling water conveying pump 80 into the SC inflow line 66.

The valve drive 76 of the valve 78 and the frequency converter 82 of the cooling water conveying pump 80 are actuated by means of an SC control device 84 which is connected to this end via control lines 86 and 88 to the valve drive 76 and the frequency converter 82, respectively.

The inflow control device 42 and the SC control device 84, or a plurality of SC control devices 84 if there are a plurality of secondary supply circuits 18, together form a control system of the industrial installation 10.

The SC control device 84 controls the valve 78 and the cooling water conveying pump 80 in a manner which is dependent on measuring parameters which it receives from a sensor system 90 which transmits associated sensor responses to the SC control device 84. The sensor system 90 comprises a plurality of sensors which transmit their sensor data to the SC control device 84, which is indicated by way of dashed connecting lines which are not provided specifically with a designation. A communication of this type can take place via corresponding data lines or in a wireless manner.

An inlet pressure sensor 92 upstream of the cooling water conveying pump 18 measures the inlet pressure of the cooling water 12 on the inlet side of the cooling water conveying pump 80. An outlet pressure sensor 94 measures the outlet pressure of the cooling water 12 on the outlet side of the cooling water conveying pump 80. In this way, the possibility for a differential pressure measurement is integrated into the pumping device 78.

Moreover, the sensor system 90 comprises an inflow temperature sensor 96 which detects the temperature of the cooling water 12 in the SC inflow line 66 on the inlet site of the consumer 16, that is to say in the present case on the inlet side of the consumer heat exchanger 64. A return temperature sensor 98 determines the temperature of the cooling water 12 in the SC return line 70 on the outlet side of the consumer 16, that is to say in the present case on the outlet side of the consumer heat exchanger 64.

In addition, a consumer sensor system 100 gives feedback to the control device 66 about operating parameters of the consumer 16 which reflect the achieved effect of the settings in the secondary supply circuit 18 on the consumer. In the present case, the consumer sensor system 100 is illustrated on the basis of a temperature sensor 102.

If the consumer heat exchanger 64 belongs, for example, to an air circulation system, the temperature sensor 102 of the consumer sensor system 100 can be arranged in that air flow of the air circulation system which has left the consumer heat exchanger 64.

Particularly energy-efficient operation of the secondary supply circuit 18 for heat transfer at the consumer 16 is possible as a result of the frequency-regulated pumping device 78:

In a first operating mode, the temperature of the cooling water 12 which enters from the SC inflow line 66 into the consumer heat exchanger 66 can be set by way of a mixing regulation. Here, the volumetric flow of the cooling water 12 through the consumer heat exchanger 64 is kept constant, and the regulation takes place via an actuation of the circulation valve 74 in the SC circulation line 72.

If, for example, the temperature sensor 102 detects that the circulating air to be temperature controlled is too cold, that is to say the temperature of the circulating air is below a setpoint temperature, and if the return temperature sensor 98 detects that the temperature of the cooling water 12 in the SC return line 70 is higher than the setpoint temperature of the circulating air, the temperature of the cooling water 12 in the SC inflow line 66 can be increased, by the circulation valve 74 being opened or being opened further, with the result that cooling water 12 flows over from the SC return line 70 into the SC inflow line 66, and the cooling water 12 which is situated there is heated overall to a higher temperature than without this overflow of cooling water 12.

The volumetric flow of the cooling water 12 in the SC inflow line 66 is kept constant by way of a corresponding regulation of the conveying pump 80.

If, in contrast, the circulating air to be temperature controlled is too warm, the circulation valve 74 can be closed, with the result that unmixed cold cooling water 12 from the PC inflow line 20 is fed to the consumer heat exchanger 64, as a result of which the circulating air to be temperature controlled is cooled.

In a second operating mode, the temperature of the cooling water 12 which enters from the SC inflow line 66 into the consumer heat exchanger 64 can be set by way of a volumetric flow regulation. Here, the circulation valve 74 is closed or remains open in a position, and the feed of the cooling water 12 from the PC inflow line 20 is regulated only via the rotational speed of the conveying pump 80. If the circulation valve 74 is closed, the cooling water which is fed into the consumer heat exchanger 64 is cold, unmixed cooling water 12, that is to say groundwater 24 which is conveyed from the well shaft 30, from the PC inflow line 20.

In a third operating mode, the setting of the temperature of the cooling water 12 which enters from the SC inflow line 66 into the consumer heat exchanger 64 takes place by way of a combination regulation which combines the above-described mixing regulation and the above-described volumetric flow regulation.

If the temperature of the circulating air to be temperature controlled is to be increased, only the rotational speed of the conveying pump 80 can be reduced here first of all to a lower threshold value, without a change in the setting of the circulation valve 74, which lower threshold value lies, for example, at 50% of the maximum rotational speed of the conveying pump 80. When this threshold value is reached, the volumetric flow is kept constant and the further temperature regulation takes place by way of a corresponding actuation of the circulation valve 74.

With the aid of the frequency-regulated pumping device 78, pressure changes in the primary supply circuit 14 can also be compensated for rapidly and reliably, which pressure changes can occur as a result of further consumers 16 in further secondary supply circuits 18.

Moreover, the SC control device 84 is set up in such a way that it is capable of detecting the energy required for operation. The pump characteristic curve of the conveying pump 80 is stored in the frequency converter 82. By way of a corresponding flow measurement in conjunction with the rotational speed of the conveying pump 80 and the result of the differential pressure measurement by way of the pressure sensors 92 and 94, the volumetric flow can be calculated and can be output as a 4-20 mA current signal, which in turn can be converted in interaction with the temperature data of the temperature sensors 96 and 98 into a value which reflects the required energy. In a manner which is dependent on the obtained data, the SC control device 84 decides which operating type is the most favorable with regard to the energy consumption and the required effectivity in the case of the temperature control operation at the consumer 16. Further energy meters can be dispensed with in the installation 10.

As a result of the flexibility in the selection of the regulating principle, that is to say mixing regulation, volumetric flow regulation or combination regulation, the secondary supply circuit 18 can be operated in an energy-optimized manner and can always be set to the most favorable energy consumption.

Overall, the conveying pump 80 is as a rule operated in all operating modes in such a way that the pressure at the outlet pressure sensor 94 is higher than at the inlet pressure sensor 92, that is to say the pressure of the cooling water 12 in the SC return line 70 is always greater than in the SC inflow line 66 upstream of the conveying pump 80 and in the consumer heat exchanger 64 or in the SC heat exchanger line 68.

In addition, a sweeping system pressure does not have to be provided in the PC inflow line 20 of the primary supply circuit 14; network pumps are not necessary in the primary supply circuit 14, as a result of which, in addition to the improved energy balance, the maintenance and servicing complexity of the installation also decreases.

In the case of one modification which is not specifically shown, the consumer heat exchanger 64 can also be configured as a plate heat exchanger.

The respective SC control device 84 of the existing secondary supply circuits 18 communicates with the inflow control device 42. It can occur, for example, that the volumetric flow of the groundwater 24 through the PC inflow line 20 is not sufficient to supply all existing secondary supply circuits 18 sufficiently with cooling water 12, such that the required cooling capacity at the consumer heat exchanger 64 is ensured. In this case, the inflow control device 42 receives a corresponding signal, whereupon the rotational speed of the groundwater conveying pump 36 is increased. Corresponding control of the groundwater conveying pump 36 takes place in a manner which is dependent on the data from the pressure sensors 38, 40 of the groundwater conveying pump 36 and the data of the temperature sensor 60, 62 at the equalizing device 56.

It can occur in the industrial installation 10 that the temperature of the conveyed groundwater 24 and therefore of the cooling water 12 which is fed into the PC inflow line 20 exceeds a predefined maximum temperature and the cooling water 12 is not sufficiently cold to provide the required cooling capacity at the secondary supply circuit or circuits 18. This can be dependent on the conveying depth of the groundwater 24, on environmental conditions and/or on the heat exchange at consumers 16, in particular if there are a plurality of secondary supply circuits 18.

The second exemplary embodiment (shown in FIG. 2) of the industrial installation 10 takes into account this fact and, to this end, additionally comprises an aftercooling system 104, by means of which cooling water 12 can be cooled in the PC inflow line 20. All of the parts and components which have already been described in conjunction with FIG. 1 have the same designations therein.

The aftercooling system 104 comprises an aftercooling heat exchanger 106, through which a PC inflow bypass line 108 of the PC inflow line 20 leads. The aftercooling heat exchanger 106 can be, for example, a plate heat exchanger. The PC inflow bypass line 108 extends between a branch 110 and a downstream opening point 112 of the PC inflow line 20. An inflow bypass valve 114 is arranged in the PC inflow line 20 between the branch 110 and the opening point 112 of the PC inflow bypass line 108, which inflow bypass valve 114 is actuated by the inflow control device 42, with the result that the PC inflow bypass line 108 can be opened or closed. The inflow bypass valve 114 can also be configured as a throttle valve, with the result that the inlet cross section can be varied.

A separate cooling medium 116 is fed in a cooling circuit line 118 to the aftercooling heat exchanger 106, which cooling medium 116 can be water or else another medium, for example glycol or a mixture of water and glycol.

The separate cooling medium 116 is cooled by means of one or more refrigerating machines 120, two refrigerating machines 120 being illustrated in the case of the present exemplary embodiment. In the case of the present exemplary embodiment, heated cooling water 12, that is to say return water 46, from the PC return line 44 is used to absorb and to dissipate the waste heat of the refrigerating machines 120.

For this purpose, a PC return bypass line 122 with a feed section 124 and a discharge section 126 leads from a branch 128 of the PC return line 44 to the refrigerating machines 120 and back again to an opening point 130 of the PC return line 44. In each case one heat exchanger loop 132 connects the feed section 124 to the discharge section 126, and runs through the heat output side of a respective refrigerating machine 120. A return bypass valve 134 is arranged in the PC return line 44 between the branch 128 and the opening point 130, which PC return line 44 is actuated by way of the inflow control device 42; a complete control line is not shown here.

When the return water 46 in the PC return line 44 is at a temperature of from 20° C. to 22° C. and flows at this temperature to the refrigerating machines 120, the return water 46 is, for example, at a temperature of from 24° C. to 30° C. afterward. At this temperature, the return water 46 then flows out of the discharge section 126 of the PC return bypass line 122 into the outflow line 50 and into the discharge well 52.

In order to monitor the temperature of the cooling water 12 which comes from the PC inflow bypass line 108, a temperature sensor 136 which transmits its signals to the inflow control device 42 is arranged downstream of the opening point 112, that is to say on the outlet side of the PC return bypass line 122.

In normal operation, both the inflow bypass valve 114 and the return bypass valve 134 of the aftercooling system 104 are open, with the result that the cooling water 12 flows neither into the PC inflow bypass line 108 nor into the PC return bypass line 122.

If the inflow control device 42 then receives the feedback from one or several SC control devices 84 of the existing secondary supply circuits 18 that the required cooling capacity is no longer produced at the consumer heat exchanger or heat exchangers 64, the inflow control device 42 can open the inflow bypass valve 114 and the return bypass valve 134 and can activate the refrigerating machines 120. The separate cooling medium 116 in the cooling circuit line 118 is cooled, for example, to 6° C. and flows through the aftercooling heat exchanger 106 at this temperature. As a result, the cooling water 12 which then flows through the PC inflow bypass line 108 is cooled accordingly and reaches the secondary supply circuit or circuits 18 afterward. In addition, the inflow control device 42 controls the rotational speed of the groundwater conveying pump 36 in a manner which is dependent on the signals of the temperature sensor 136.

In the case of the currently shown exemplary embodiment, this aftercooling takes place before the cooling water 12 reaches the first secondary supply circuit 18 in the flow direction. For this purpose, the branch 110 and the opening point 112 of the PC inflow bypass line 108 and also the aftercooling heat exchanger 106 are arranged between the equalizing device 56 and the first secondary supply circuit 18.

In the case of modifications which are not shown specifically with a plurality of secondary supply circuits 18, the aftercooling can also take place, however, between two adjacent secondary supply circuits 18 which are flowed through one after another by the cooling water 12. For this purpose, the branch 110 and the opening point 112 of the PC inflow bypass line 108 and the aftercooling heat exchanger 106 are then correspondingly arranged between the two SC inflow lines 66 of the adjacent secondary supply circuits 18. In this way, a plurality of aftercooling heat exchangers 106 can also be provided between in each case two adjacent secondary supply circuits 18.

Figure 3:
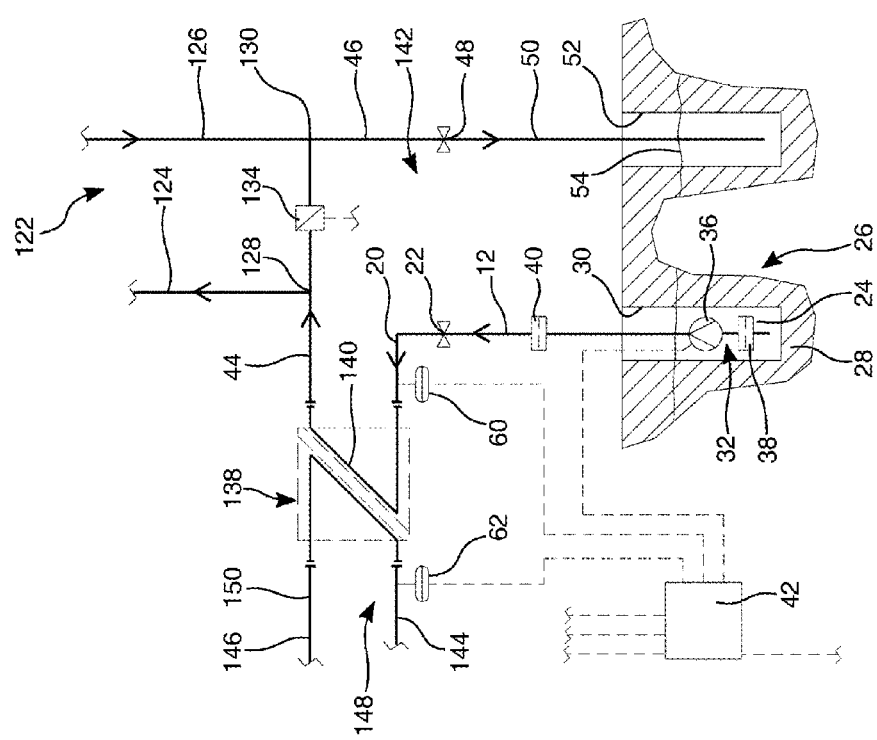
FIG. 3 shows a detail of a modified industrial installation with a heat exchanger.

In the case of one alternative modification (shown in FIG. 3), a heat exchanger 138, in particular a plate heat exchanger, can be provided instead of the equalizing device 56 or the hydraulic separator 58. In this case, the PC inflow line 20 and the PC return line 44 are connected to one another in this heat exchanger 138 by way of a heat exchanger line 140 to form a line which defines a first sub-primary circuit 142 of the primary circuit 14. In this sub-primary circuit 142, the groundwater 24 is then conducted as cooling medium 12.

Figure 2:
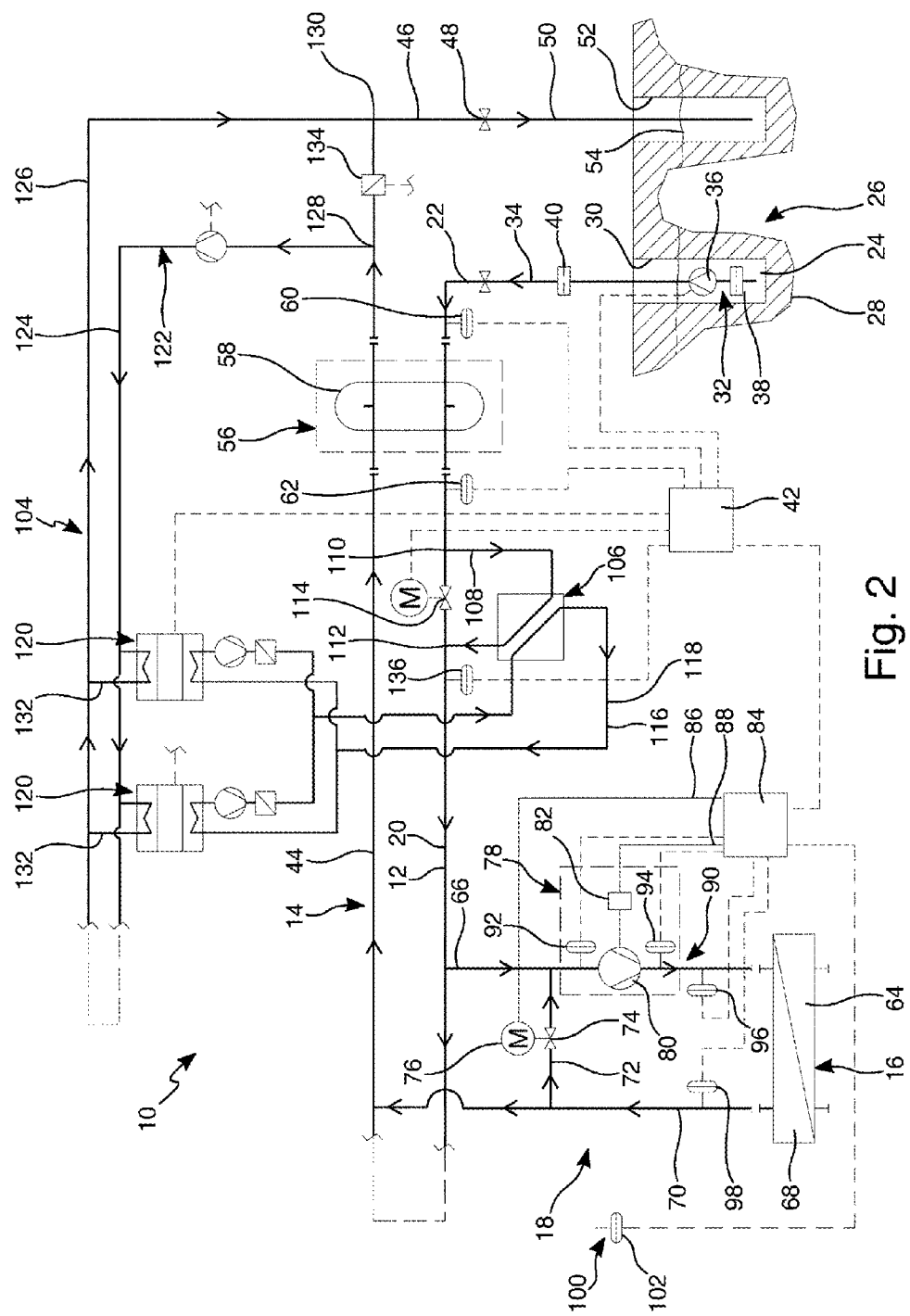
FIG. 2 shows a diagrammatic layout of an industrial installation in accordance with a second exemplary embodiment.

The PC inflow line 20 and PC return line 44 which are shown in each case in FIGS. 1 and 2 are configured by way of a sub-inflow line 144 and a sub-return line 146 of a second sub-primary circuit 148 which is coupled firstly to the existing secondary circuits 18 and secondly via the heat exchanger 138 to the first sub-primary circuit 142. A separate cooling medium is conducted in the second sub-primary circuit 148, which separate cooling medium is cooled by way of the heat exchanger 138. This separate cooling medium can be, for example, glycol or a mixture of water and glycol.

The statements made above with respect to the exemplary embodiments according to FIGS. 1 and 2 accordingly apply analogously, the sub-inflow line 144 taking the place of the PC inflow line 14, and the sub-return line 146 taking the place of the PC return line 44.

What is claimed is:

1. An industrial installation comprising:
   a) a primary supply circuit, in which cooling water is conducted;
   b) a consumer, to which cooling water from the primary supply circuit is made available, and which is connected via a secondary supply circuit to the primary supply circuit for this purpose;
   c) an inflow line of the secondary supply circuit being connected to an inflow line of the primary supply circuit, and a return line of the secondary supply circuit being connected to a return line of the primary supply circuit;
   d) a circulation line connecting the return line of the secondary supply circuit to the inflow line of the secondary supply circuit, the circulation line being selectively openable and closable to provide a fluidic connection between the return line of the secondary supply circuit and the inflow line of the secondary supply circuit;
   wherein
   e) the inflow line of the primary supply circuit is connected to a groundwater conveying line of a well system which comprises a groundwater conveying device and by means of which groundwater can be conveyed out of an aquifer and by means of which this groundwater can be fed as cooling water into the inflow line of the primary supply circuit.

2. The industrial installation as claimed in claim 1, wherein the return line of the primary supply circuit is connected to an outflow line which outputs cooling water as return water to a discharge well of the well system or outputs it to the environment in another way.

3. The industrial installation as claimed in claim 1, wherein the primary supply circuit is connected to an aftercooling system, by means of which cooling water can be cooled in the inflow line of the primary supply circuit.

4. The industrial installation as claimed in claim 3, wherein the aftercooling system comprises an aftercooling heat exchanger, through which an inflow bypass line of the inflow line of the primary supply circuit leads and to which a separate cooling medium can be fed, it being possible for the inflow bypass line to be opened or closed by means of an inflow bypass valve.

5. The industrial installation as claimed in claim 4, wherein the aftercooling system comprises one or more refrigerating machines, by means of which the separate cooling medium is cooled.

6. The industrial installation as claimed in claim 5, wherein a return bypass line of the primary supply circuit leads from its return line to the one or more refrigerating machines and back again to the return line, the heat output side of the one or more refrigerating machines being connected via a heat exchanger loop to the return bypass line.

7. The industrial installation as claimed in claim 1, wherein a frequency-regulated pumping device with a cooling water conveying pump and a frequency converter which is assigned to the cooling water conveying pump is provided for conveying the cooling water through the secondary supply circuit.

8. The industrial installation as claimed in claim 7, wherein the circulation line selectively conducts cooling water out of the return line of the secondary supply circuit in a circulating manner into the inflow line of the secondary supply circuit, the circulation line opening upstream of the cooling water conveying pump into the inflow line of the secondary supply circuit, and/or there being a circulation valve, by means of which the proportion of cooling water which flows through the circulation line into the inflow line of the secondary supply circuit can be set.

9. The industrial installation as claimed in claim 1, wherein the groundwater conveying device can be actuated by means of a control system.

10. The industrial installation as claimed in claim 9, wherein the control system is connected to a sensor system, by means of which
    a) the inlet pressure of the groundwater on the inlet side of the groundwater conveying device and/or the outlet pressure of the groundwater on the outlet side of the groundwater conveying device;
    and/or
    b) the inlet pressure of the cooling water on the inlet side of the cooling water conveying pump and/or the outlet pressure of the cooling water on the outlet side of the cooling water conveying pump;
    and/or
    c) the temperature of the cooling water in the inflow line of the secondary supply circuit on the inlet side of the consumer heat exchanger and/or the temperature of the cooling water in the return line of the secondary supply circuit on the outlet side of the consumer heat exchanger;
    and/or
    d) the temperature of the cooling water in the inflow line of the primary supply circuit on the outlet side of the return bypass line;
    can be detected, and the associated sensor responses can be transmitted to the control system.

11. A method for operating an industrial installation with a primary supply circuit for cooling water, which primary supply circuit is connected to at least one secondary supply circuit for the cooling water, by means of which secondary supply circuit the cooling water is made available to a consumer, an inflow line of the secondary supply circuit being connected to an inflow line of the primary supply circuit, and a return line of the secondary supply circuit being connected to a return line of the primary supply circuit,
    wherein
    naturally occurring groundwater is used as cooling water, which groundwater is obtained from an aquifer with the aid of a well system; and
    a circulation line is selectively openable and closable to provide a fluidic connection between the return line of the secondary supply circuit and the inflow line of the secondary supply circuit.

12. The method as claimed in claim 11, wherein the cooling water is cooled in the inflow line of the primary supply circuit with the aid of an aftercooling system if the temperature of the cooling water exceeds a predefined maximum temperature.

13. The method as claimed in claim 11 wherein an industrial installation is operated, the industrial installation comprising
    a) a primary supply circuit, in which cooling water is conducted;
    b) a consumer, to which cooling water from the primary supply circuit is made available, and which is connected via a secondary supply circuit to the primary supply circuit for this purpose;

c) an inflow line of the secondary supply circuit being connected to an inflow line of the primary supply circuit, and a return line of the secondary supply circuit being connected to a return line of the primary supply circuit, wherein d) the inflow line of the primary supply circuit is connected to a groundwater conveying line of a well system which comprises a groundwater conveying device and by means of which groundwater can be conveyed out of an aquifer and by means of which this groundwater can be fed as cooling water into the inflow line of the primary supply circuit.

14. The industrial installation as claimed in claim 5, wherein the groundwater conveying device and/or the inflow bypass valve and/or the refrigerating machine can be actuated by means of a control system.

15. The industrial installation as claimed in claim 7, wherein the groundwater conveying device, the frequency-regulated pumping device and/or the circulation valve can be actuated by means of a control system.

* * * * *